United States Patent
Hatke et al.

(10) Patent No.: US 8,063,163 B2
(45) Date of Patent: Nov. 22, 2011

(54) CYCLOOLEFIN COPOLYMER

(75) Inventors: Wilfried Hatke, Kelkheim (DE); Matthias Bruch, Moerfelden-Walldorf (DE); Anne-Meike Schauwienold, Hofheim (DE); Udo Manfred Stehling, Koenigstein im Taunus (DE); Hiroyuki Kanai, Shizuoka (JP); Hajime Serizawa, Shizuoka (JP); Hiroshi Hiraike, Osaka (JP); Takahiko Sawada, Osaka (JP); Kazunari Yagi, Osaka (JP); Isao Higuchi, Osaka (JP); Katsunori Toyoshima, Osaka (JP); Takeharu Morita, Osaka (JP)

(73) Assignees: Polypastics Co., Ltd., Tokyo (JP); Topas Advanced Polymers GmbH, Frankfurt am Main ( * ) Notice: Subject to any disclaimer, the term of this patent is extended or adjusted under 35 U.S.C. 154(b) by 448 days.

(21) Appl. No.: 12/093,801
(22) PCT Filed: Nov. 24, 2005
(86) PCT No.: PCT/JP2005/021593
§ 371 (c)(1),
(2), (4) Date: Jul. 2, 2008
(87) PCT Pub. No.: WO2007/060723
PCT Pub. Date: May 31, 2007

(65) Prior Publication Data
US 2009/0163632 A1 Jun. 25, 2009

(51) Int. Cl.
C08F 232/08 (2006.01)
C08K 5/20 (2006.01)
C08K 5/10 (2006.01)
C08F 4/642 (2006.01)
(52) U.S. Cl. ........ 526/283; 526/127; 526/160; 526/281; 524/210; 524/284; 524/553
(58) Field of Classification Search ............... 526/281, 526/283, 282, 127, 160; 524/210, 284, 553
See application file for complete search history.

(56) References Cited

U.S. PATENT DOCUMENTS
5,698,645 A 12/1997 Weller et al.
2004/0170785 A1* 9/2004 Wurtzel et al. ............ 428/35.7

FOREIGN PATENT DOCUMENTS
DE 224538 A 7/1985
(Continued)

OTHER PUBLICATIONS

Office Action issued to CN patent appln. No. 200580052110.1 mailed Mar. 16, 2010.
Office Action issued to SG Application No. 200603741-8, mailed Mar. 12, 2010.
Notice of Reasons for Rejection issued to KR Application No. 10-2008-7015298, mailed Apr. 28, 2010.
Incoronata Tritto, et al., "Ethylene-Norbornene Copolymer Microstructure. Assessment and Advances Based on Assignments of 13C NMR Spectra", Macromolecules, 2000, vol. 33, pp. 8931-8944.

(Continued)

Primary Examiner — Fred M Teskin
(74) Attorney, Agent, or Firm — Carter, DeLuca, Farrell & Schmidt, LLP (57) ABSTRACT

A novel cycloolefin copolymer that can be employed in the production of molding with fewer defects, for example, fewer gel particles (fish eyes). There is provided a cycloolefin copolymer comprising 80 to 20 mol % of repeating units derived from an α-olefin monomer and 20 to 80 mol % of repeating units derived from at least one cycloolefin monomer selected from the group consisting of monomer of the general formula (I), monomer of the general formula (II), monomer of the general formula (III), monomer of the general formula (IV) and monomer of the general formula (V), wherein with respect to the repeating units derived from cycloolefin monomer, the proportion thereof being present in the form of dimer (Rd) is 50 mol % or below and the proportion thereof being present in the form of trimer (Rt) 5 mol % or above.

15 Claims, 4 Drawing Sheets

FOREIGN PATENT DOCUMENTS

| | | | |
|---|---|---|---|
| DE | 241971 | A | 1/1987 |
| EP | 0384694 | A2 | 8/1990 |
| EP | 0503422 | A1 | 9/1992 |
| EP | 0504418 | A1 * | 9/1992 |
| EP | 0610814 | A2 | 8/1994 |
| EP | 0610815 | A2 | 8/1994 |
| EP | 0610816 | A2 | 8/1994 |
| EP | 0688801 | A1 | 12/1995 |
| EP | 0 688 801 | B1 | 12/1997 |
| EP | 0946618 | B1 | 10/1999 |
| EP | 1085025 | A1 | 3/2001 |
| EP | 1085025 | A1 | 3/2001 |
| EP | 1217015 | A1 | 6/2002 |
| EP | 1217015 | A1 | 6/2002 |
| JP | H08-012712 | A | 1/1996 |
| JP | 2001-114837 | A | 4/2001 |
| WO | 00/46254 | A1 | 8/2000 |

OTHER PUBLICATIONS

The extended European search report issued to EP Application No. 05809409.5, mailed Feb. 10, 2011.

Beulich, "Microstructure of ethene norbornene copolymers", Macromolecules, vol. 32, No. 22, Nov. 2, 1999, pp. 7335-7343.

Wu-Jang Huang et al., "Copolymerization of norbornene with ethylene: A high-resolution liquid NMR, DSC and solid state NMR study", Journal of Polymer Research, vol. 7, No. 1, Mar. 1, 2000, pp. 51-56.

Ralf Alexander Wendt, et al., "13C NMR Studies of Ethene/Norbornene Copolymers using 13C-Enriched Monomers: Signal Assignments of Copolymers Containing Norbornene Microblocks of up to a Length of Three Norbornene Units", Macromolecular Chemistry and Physics, 2001, vol. 202, pp. 3490-3501.

* cited by examiner

MESO BODY            RACEMIC BODY

CYCLOOLEFIN COPOLYMER

TECHNICAL FIELD

The present invention relates to a new cycloolefin-based copolymer having a characteristic microstructure. The cycloolefin-based copolymer of the present invention can be used for production of a molded body having few defects of the molded body such as gel particles (fish eyes). In particular, the present invention relates to a molded body that is excellent in heat resistance, low specific-gravity property, low photoelasticity, and low wavelength-dispersion property, by utilizing the new cycloolefin-based copolymer having a characteristic microstructure.

BACKGROUND ART

The cycloolefin-based copolymer has excellent characteristics such as high transparency (for optical applications), low photoelasticity (birefringence is not readily caused by external stress), good dielectric property (for a condenser dielectric body), low water-absorbance, high softening temperature (particularly, when the content of cycloolefin is large) (for high-temperature applications), and high vapor barrier property (for the packaging film field). In general, the cycloolefin-based copolymer is often synthesized under the presence of methallocene catalysis and production methods thereof are described in, for example, Patent Document 1, Patent Document 2, and so forth.

With respect to the molded body in which the cycloolefin-based copolymer is used such as a film, a cast film of ethylene-norbornene copolymer is described in Patent Document 3 and Patent Document 4. And, a film made of cycloolefin-based copolymer such as norbornene copolymer is described in Patent Document 5. And, a sheet of a semicrystalline cycloolefin copolymer is described in Patent Document 6. And, a film of cycloolefin copolymer is disclosed in Patent Document 7. And, a film having high rigidity based on a cycloolefin copolymer is disclosed in Patent Document 8. However, cycloolefin-based copolymers have the tendency that defects, also called fish eyes, due to gel particles, easily occur in molding. The copolymer has the problems that the defects inhibit the performance of the molded body, and utilization thereof is restricted.

Patent Document 1: EU Patent Publication No. 0503422
Patent Document 2: EU Patent Publication No. 0946618
Patent Document 3: DE Patent Publication No. 224538
Patent Document 4: DE Patent Publication No. 241971
Patent Document 5: EU Patent Publication No. 0384694
Patent Document 6: EU Patent Publication No. 0610814
Patent Document 7: EU Patent Publication No. 0610815
Patent Document 8: EU Patent Publication No. 0610816

DISCLOSURE OF THE INVENTION

Problems to be Solved by the Invention

Under the above-described present situation, an object of the present invention is to provide a new cycloolefin-based copolymer that can be used for production of a molded body having few defects of the molded body such as gel particles (fish eyes).

Means for Solving the Problems

The present invention is a cycloolefin-based copolymer including: 20-80 mole % of repeating units derived from at least one cycloolefin-based monomer selected from the group consisting of a monomer represented by a general formula (I), a monomer represented by the general formula (II), a monomer represented by the general formula (III), a monomer represented by the general formula (IV), and a monomer represented by the general formula (V); and 80-20 mole % of repeating units derived from an α-olefin-based monomer, the repeating units derived from the cycloolefin-based monomer having a ratio of their presence as a dimer form (Rd) of 50 mole % or less and a ratio of their presence as a trimer form (Rt) of 5 mole % or more.

In the formula, $R^1$, $R^2$, $R^3$, and $R^4$ each independently of the others represents hydrogen, a linear or branched alkyl group having a carbon number of 1 to 8, an aryl group having a carbon number of 6 to 18, an alkylene aryl group having a carbon number of 7 to 20, or a cyclic or non-cyclic alkenyl group having a carbon number of 2 to 20. Moreover, a carbon atom may be covalently bonded to $R^1$, $R^2$, $R^3$, and $R^4$ by a saturated, unsaturated, or aromatic ring. Furthermore, $R^1$, $R^2$, $R^3$, and $R^4$ may be replaced by a polar group of halogen atom, hydroxyl group, ester group, alkoxy group, carboxy group, cyano group, amido group, imido group, or silyl group.

Figure 1:
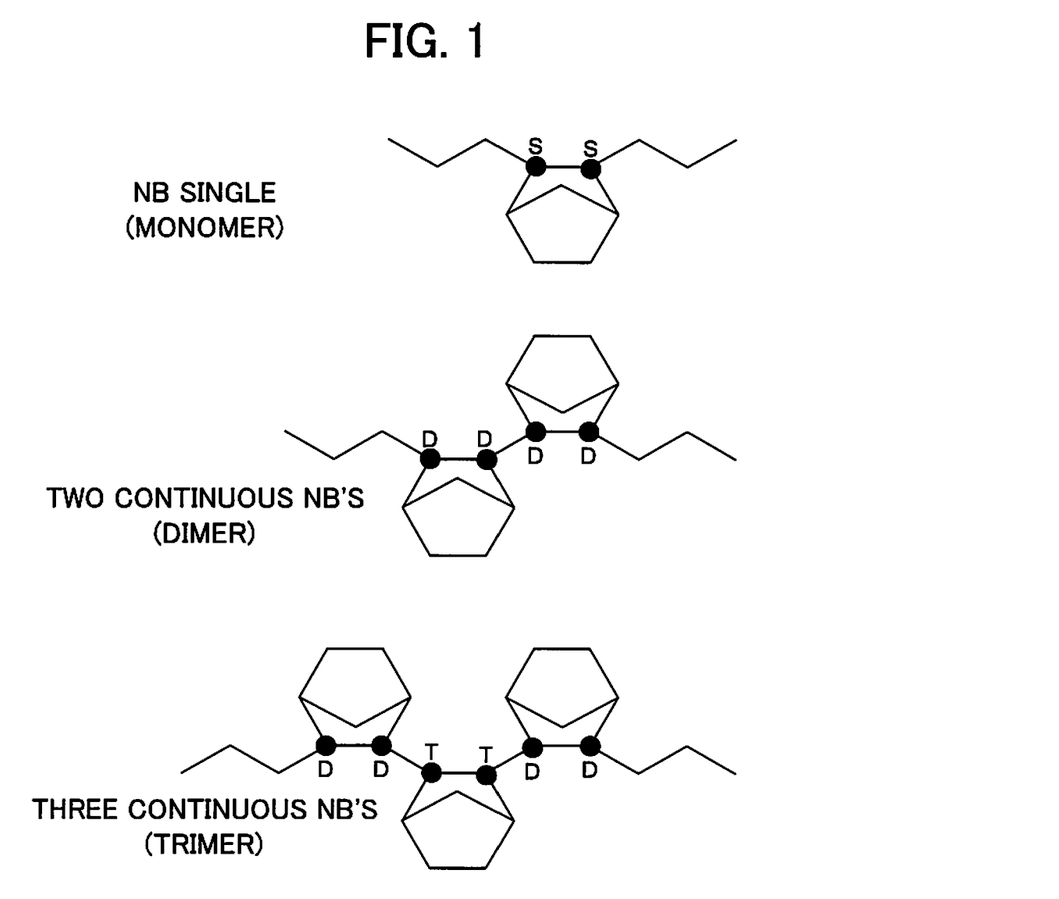
FIG. 1 is a schematic view for explaining the continuity of the repeating units derived from the cycloolefin-based monomer.

Viewed from the view point of continuity of the repeating units derived from the cycloolefin-based monomer, the molecular structure of the cycloolefin-based monomer includes: a case in which the repeating units derived from cycloolefin-based monomer are mainly monomers (a case in which the repeating units derived from the α-olefin-based monomer are bonded to both sides of one repeating unit derived from cycloolefin-based monomer); a case in which the repeating units derived from cycloolefin-based monomer are dimers (a case in which the repeating units derived from the α-olefin-based monomer are bonded to both sides of two continuously bonded repeating units derived from cycloolefin-based monomer); and a case in which the repeating units derived from cycloolefin-based monomer are trimers (a case in which the repeating units derived from the α-olefin-based monomer are bonded to both sides of three continuously bonded repeating units derived from cycloolefin-based monomer). In addition, a case in which the repeating units derived from cycloolefin-based monomer are tetramers or more (a case in which the repeating units derived from the α-olefin-based monomer are bonded to both sides of four or more continuously bonded repeating units derived from cycloolefin-based monomer) cannot be detected by $^{13}$C-NMR to be described later, and therefore, can be ignored in the present specification. In FIG. 1, a schematic view for explaining continuity of the repeating units derived from the cycloolefin-based monomer (norbornene) in the cycloolefin-based copolymer is shown.

The present inventors have intensively studied to find that in the cycloolefin-based copolymer, when the ratio of the presence of dimers and trimers is in a specific range, a characteristic microscopic structure is formed, and surprisingly, defects due to gel particles, which are so-called fish eyes, do not readily occur and a clear molded body having high quality can be obtained.

Figure 2:
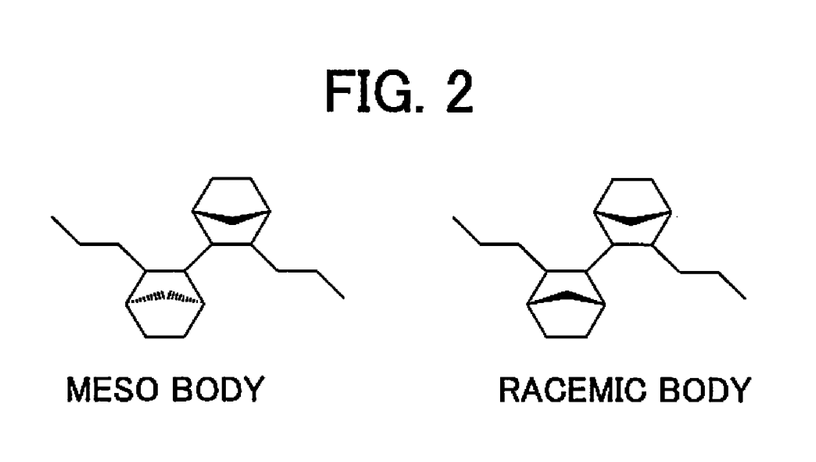
FIG. 2 is a schematic view for explaining the structures of the meso-body and racemic body in the repeating units derived from cycloolefin-based monomer present as a dimmer.

The present inventors have further intensively studied to find that in repeating units derived from cycloolefin-based monomer existing as a dimer, when a "meso body" in which bridgehead positions of the cycloolefin-based monomers contiguous to each other face the opposite directions and a "racemic body" in which the bridgehead positions face the same direction are compared, the occurrence of fish eyes is reduced in cycloolefin-based copolymers having a higher ratio of the meso bodies, even for the same dimers, and the occurrence of fish eyes is greater in the cycloolefin-based copolymer having a higher ratio of the racemic bodies. In FIG. 2, a schematic view for explaining the structures of the meso-body and racemic body in the repeating units derived from cycloolefin-based monomer existing as dimer is shown.

The cycloolefin-based copolymer of the present invention has repeating units derived from the cycloolefin-based monomer and repeating units derived from the α-olefin-based monomer. The cycloolefin-based monomer is at least one selected from the group consisting of a monomer represented by the general formula (I), a monomer represented by the general formula (II), a monomer represented by the general formula (III), a monomer represented by the general formula (IV), and a monomer represented by the general formula (V). Among them, the monomer represented by the general formula (I), the monomer represented by the general formula (IV), and the monomer represented by the general formula (V) are preferable. Specifically, norbornene, alkyl-substituted norbornene, vinyl norbornene, norbornadiene or tetracyclododecene are preferable, and norbornene is more preferable. Moreover, in another embodiment of the present invention, at least one of $R^1$ to $R^4$ and/or $R^9$-$R^{12}$ of the α-olefin-based monomer represented by the chemical formula (VI) to be described later is unsaturated. When such an unsaturated group is contained, further, a branched chain can be formed or a cross-linkage can be formed, and thereby, size fixation, chemical modification, and so forth of a thermoformed part can be performed. The formation of a long-chain branched chain (by introducing a side chain into a second double bond of a diene monomer) can be performed by appropriate selection of polymerization conditions (a sufficiently long reaction time for achieving high substitution).

In the cycloolefin-based copolymer of the present invention, the lower limit of the content of the above-described repeating units derived from cycloolefin-based monomer is 20 mole % and the upper limit thereof is 80 mole %. If the content is less than 20 mole %, the thermal resistance may be low and the practicability may become inferior. If the content is more than 80 mole %, the temperature required for processing may become high and the workability may become inferior and the obtained molded body may be colorized. The preferable lower limit is 40 mole %, and the preferable upper limit is 60 mole %.

The above-described α-olefin-based monomer is not particularly limited as long as it is capable of being copolymerized with the cycloolefin-based copolymer. However, for example, the monomers represented by the following formula (VI) is preferable. Among them, ethylene is more preferable. The above-described α-olefin-based monomer represented by the following formula (VI) may be used singly or in combinations of two kinds or more.

(VI)

In the formula, $R^9$, $R^{10}$, $R^{11}$, and $R^{12}$ each represents hydrogen, a linear or branched alkyl group having a carbon number of 1 to 8, or an aryl group having a carbon number of 6 to 18. Among them, monomers in which $R^9$, $R^{10}$, $R^{11}$, and $R^{12}$ each represents hydrogen or an alkyl group having a carbon number of 1 to 6 such as ethyl group and propyl group is preferable.

In the cycloolefin-based copolymer of the present invention, the lower limit of the content of the above-described repeating units derived from α-olefin-based monomer is 20 mole % and the upper limit thereof is 80 mole %. If the content is less than 20 mole %, the temperature required for processing may become high and the workability may become inferior and the obtained molded body may become colorized. If the content is more than 80 mole %, the thermal resistance may be low and the practicability may become inferior. The preferable lower limit is 40 mole %, and the preferable upper limit is 60 mole %.

The cycloolefin-based copolymer of the present invention may contain repeating units derived from another monomer that can be copolymerized with the cycloolefin-based monomer and the α-olefin-based monomer. Such other monomers are not particularly limited and include dienes and cyclic olefins. Among them, the monomers represented by the following formula (VII) are preferable.

(VII)

In the formula, m represents an integer of 2 to 10.

In the cycloolefin-based copolymer of the present invention, the upper limit of the content of the above-described repeating units derived from the other monomer is 10 mole %. If the content is more than 10 mole %, desired performance such as thermal resistance expected in the cycloolefin-based copolymer may not be obtained. A more preferable upper limit is 5 mole %, and an even more preferable upper limit is 3 mole %.

In the cycloolefin-based copolymer of the present invention, the repeating units derived from the cycloolefin-based monomer have a ratio of their presence as a dimer (Rd) of 50 mole % or less and a ratio of their presence as a trimer (Rt) of 5 mole % or more. Outside of this range, fish eyes may easily occur in the obtained molded body. It is preferable that Rd is 40 mole % or less and Rt is 8 mole % or more. It is more preferable that Rd is 18-40 mole % and Rt is 8-26 mole %.

It is preferable that in the cycloolefin-based copolymer of the present invention, the repeating units derived from the cycloolefin-based monomer present as a dimer have a ratio of racemic form (Rr) of 8 mole % or less. If Rr is more than 8 mole %, the occurrence of fish eyes in the obtained molded body increases.

The ratio of the repeating units derived from the cycloolefin-based monomer present as a dimer (Rd) in the cycloolefin-based copolymer of the present invention, the ratio of the repeating units derived from the cycloolefin-based monomer present as a trimer (Rt), the ratio of the meso bodies in the repeating units derived from the cycloolefin-based monomer that are present as a dimer (Rm), the ratio of the racemic bodies in the repeating units derived from the cycloolefin-based monomer that are present as a dimer (Rr), and so forth can be obtained from an integral value of a $^{13}$C-NMR spectrum. The primary structure of the polymer identified by each of the spectra is described in Macromolecules, 2000, Vol. 33. Page 8931, Macromol. Chem. Phys., 2001, Vol. 202, Page 3490, and so forth.

The method for obtaining the above-described parameters will be specifically explained with using as an example the cycloolefin-based copolymer in the case that the cycloolefin-based monomer is norbornene and the α-olefin-based monomer is ethylene. The integral value of the spectrum observed when the chemical shift value in the spectrum chart obtained by $^{13}$C-NMR measurement is 44-45.8 ppm is set to be Is, and the integral value of the spectrum observed when the chemical shift value is 45.8-48 ppm is set to be Id, and the integral value of the spectrum observed when the chemical shift value is 49-50, 52-53 ppm is set to be It, and the integral value of the spectrum observed when the chemical shift value is 45.8-47.5 ppm is set to be Im, and the integral value of the spectrum observed when the chemical shift value is 47.5-48 ppm is set to be Ir, and the integral value of the spectrum observed when the chemical shift value is 25-34 ppm is set to be Ie, and the sum of the integral values of the spectrum observed when the chemical shift values are 34-42, 44-48, 49-50, and 52-53 ppm is set to be In.

Figure 3:
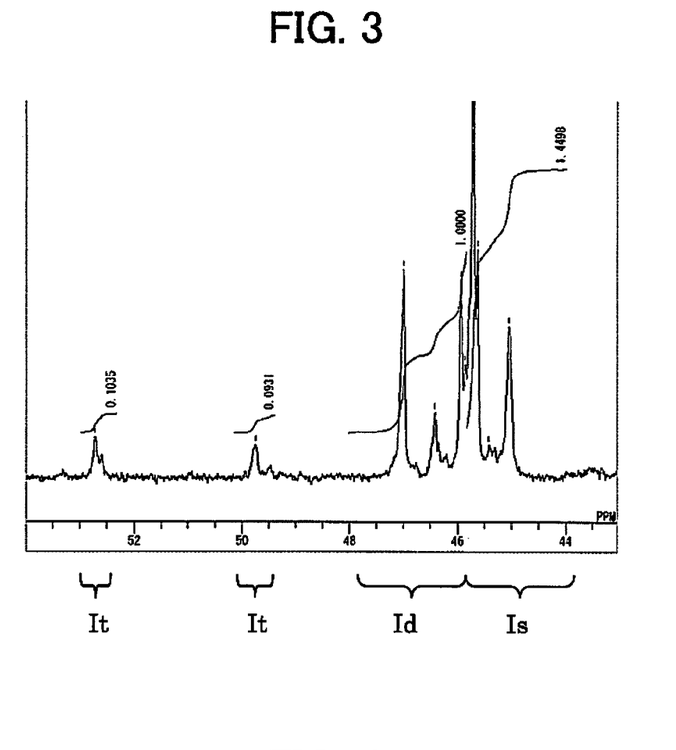
FIG. 3 is a $^{13}$C-NMR spectrum associated with the It, Id, and Is of the cycloolefin-based copolymer when the cycloolefin-based monomer is norbornene and the α-olefin-based monomer is ethylene.
Figure 4:
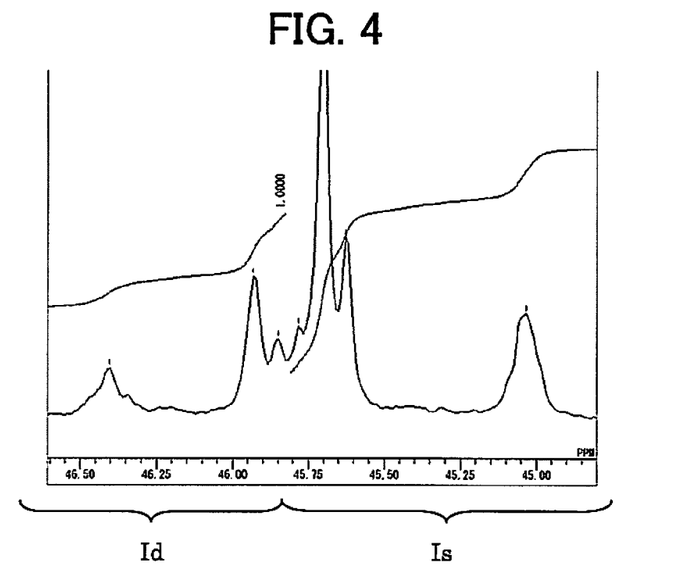
FIG. 4 is an enlarged view of a border part of the Id and Is of the $^{13}$C-NMR spectrum when the cycloolefin-based monomer is norbornene and the α-olefin-based monomer is ethylene.

FIG. 3 shows a $^{13}$C-NMR spectrum associated with It, Id, and Is of the cycloolefin-based copolymer when the cycloolefin-based monomer is norbornene and the α-olefin-based monomer is ethylene. FIG. 4 shows an enlarged view of the border part of Id and Is. From the documents, the It represents the integral value provided by one central norbornene monomer out of the spectra of three bonded units of cycloolefin-based monomer in the cycloolefin-based copolymer, and the Id represents the integral value provided by the spectra of two bonded units of cycloolefin-based monomer and by two norbornene monomers of both ends out of three bonded units of cycloolefin-based monomer, and the Is represents the integral value provided by the spectrum of one unit of cycloolefin-based monomer. This is shown in FIG. 3. Here, the peak of the spectrum of S in FIG. 1 appears in a region of Is, and the spectrum peak of D appears in the region of Id, and the spectrum peak of T appears in the region of It. The attributions thereof target at CH forming the polymer main chains out of carbons of the norbornene monomers. From above, the ratio of the repeating units derived from the cycloolefin-based monomer present as a dimer (Rd) can be obtained by the following formula.

$$Rd=(Id-2\times It)/(It+Id+Is)$$

Moreover, the ratio of the repeating units derived from the cycloolefin-based monomer present as a trimer (Rt) can be obtained by the following formula.

$$Rt=3\times It/(Is+Id+It)$$

Figure 5:
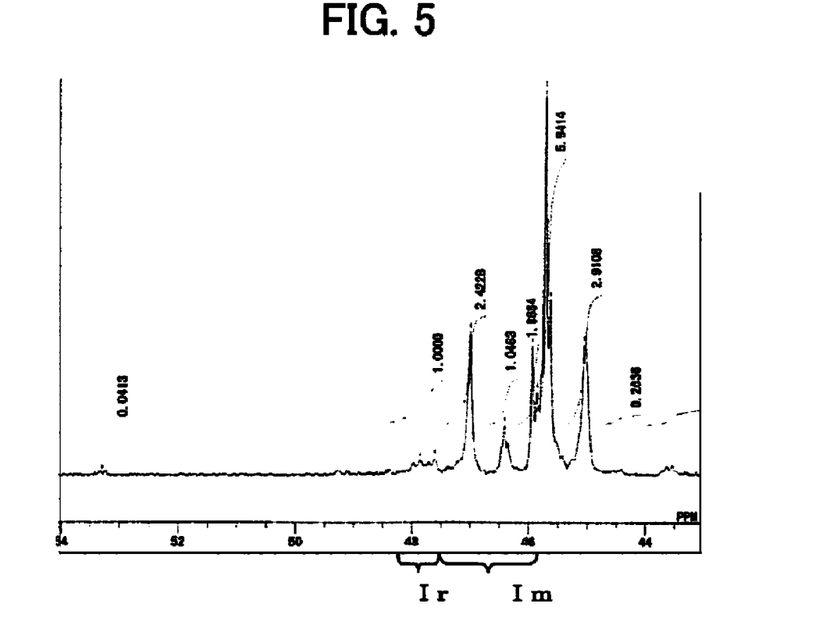
FIG. 5 is a $^{13}$C-NMR spectrum associated with Im and Ir of the cycloolefin-based copolymer when the cycloolefin-based monomer is norbornene and the α-olefin-based monomer is ethylene.

Moreover, in the same document, the attributions of $^{13}$C-NMR spectra when the repeating units derived from the cycloolefin-based monomer present as a dimer are meso bodies and racemic bodies are shown, the ratio of the racemic bodies (Rr) and the ratio of the meso bodies can also be obtained by using the integral values of these spectra. FIG. 5 is a $^{13}$C-NMR spectrum associated with Im and Ir of the cycloolefin-based copolymer when the cycloolefin-based monomer is norbornene and the α-olefin-based monomer is ethylene. The ratio of the racemic bodies in the repeating units derived from the cycloolefin-based monomer present as a dimer (Rr) can be obtained by the following formula.

$$Rr=Ir/(Ir+Im)$$

In addition, the ratio of the meso bodies in the repeating units derived from the cycloolefin-based monomer present as a dimer (Rm) can be obtained by the following formula.

$$Rm=Im/(Ir+Im)$$

In addition, Ir+Im=Id.

Figure 6:
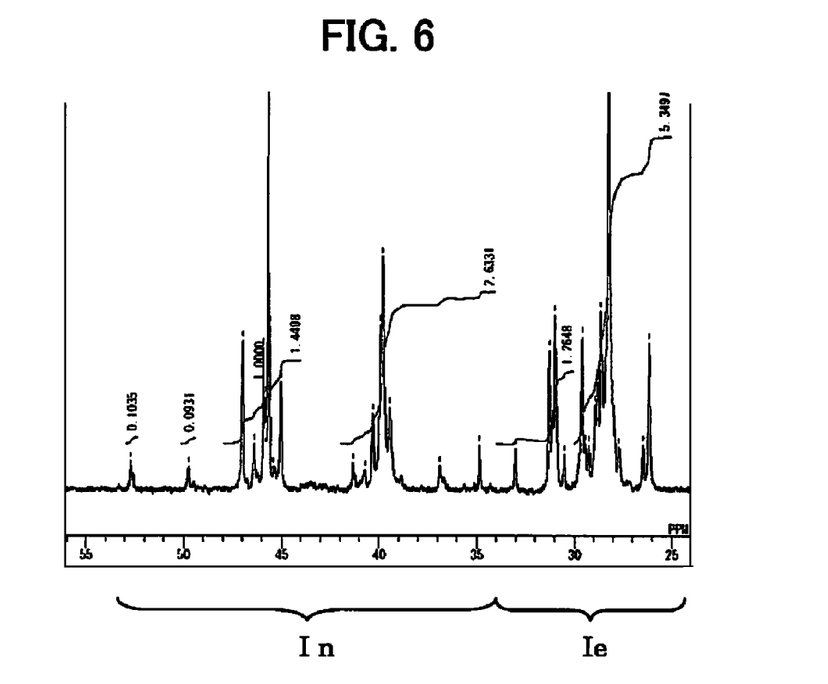
FIG. 6 is a $^{13}$C-NMR spectrum associated with Ie and In of the cycloolefin-based copolymer when the cycloolefin-based monomer is norbornene and the α-olefin-based monomer is ethylene.

Moreover, in the same document, it is described that the content of repeating units derived from norbornene in the cycloolefin-based copolymer (Rn) and the content of repeating units derived from ethylene (Re) can also be obtained from the integral values of the spectra observed by the $^{13}$C-NMR measurement. In this calculation, the number of monomers is relatively calculated from the number of carbon atoms in the spectrum. FIG. 6 is a $^{13}$C-NMR spectrum associated with Ie and In of the cycloolefin-based copolymer when the cycloolefin-based monomer is norbornene and the α-olefin-based monomer is ethylene. The content of repeating units derived from norbornene in the cycloolefin-based copolymer (Rn) can be obtained by the following formula.

$$Nn=In/4$$

$$Ne=(Ie-3\times Nn)/2$$

$$Rn=Nn/(Ne+Nn)$$

In addition, actually, when the $^{13}$C-NMR spectrum is measured, it is difficult to completely separate all of the peaks, and the peaks overlap one another. Also, according to the measurement apparatus and measurement conditions of the $^{13}$C-NMR, the possibility that the integral values and the ratio of the integral values are slightly displaced cannot be excluded. Therefore, one preferable example of the sample control conditions and the measurement conditions in the present invention is shown in the following.

Solvent: 1,1,2,2-tetrachloroethane-$d_2$
Concentration: 10% by weight
Measurement apparatus: JNM-AL300 manufactured by JEOL Ltd. (resonant frequency of hydrogen atom: 300 MHz)
Diameter of sample tube: 5 mm
Measurement temperature: 100° C.
Measurement method: power gate method
Pulse width: 4.1 μsec Delay time: 1.394 sec
Time for importing data: 1.606 sec
Observation frequency width: 20408 Hz
Decoupling: complete decoupling
Integrating times: 10000
Reference of chemical shift: the central peak of the triplet of tetrachloroethane is set to 72.05 ppm.

The preferable lower limit of the number average molecular weight of the cycloolefin-based copolymer is 5000, and the preferable upper limit thereof 500,000. When the number average molecular weight is less than 5000, it is possible that a molded body having sufficient strength is not obtained. When the number average molecular is more than 500,000, the moldability may become inferior. The more preferable lower limit is 10,000 and the more preferable upper limit is 200,000. Moreover, for the molecular weight of the cycloolefin-based copolymer, Melt Volume Rate (MVR) can be used as an index. The MVR can be measured based on ISO 1133 and means the volume (mL/10 minutes) of resin discharged for 10 minutes when the temperature is 260° C. and the load is 2.16 kg. The preferable lower limit of the cycloolefin-based copolymer is 0.1 mL/10 minutes, and the preferable upper limit thereof is 500 mL/10 minutes. When less than 0.1 mL/10 minutes, it is possible that a molded body having sufficient strength is not obtained. When more than 500 mL/10 minutes, the molding property may be inferior. The more preferable lower limit is 0.5 mL/10 minutes, and the more preferable upper limit is 200 mL/10 minutes.

The preferable lower limit of the glass transition temperature of the cycloolefin-based copolymer is 50° C. and the preferable upper limit thereof is 250° C. When less than 50° C., the thermal resistance may be low and the applicability of the obtained molded body may be limited. When more than 250° C., the workability may be bad or the obtained molded body may be colorized. The more preferable lower limit is 80° C., and the more preferable upper limit is 200° C. The glass transition temperature (Tg) of the cycloolefin-based copolymer is affected by the blending ratio of the repeating units of which it is composed. In particular, in the case of a cycloolefin-based copolymer synthesized only by the cycloolefin-based monomer represented by the above-described formula (I) and ethylene, when the ratio of the repeating units derived from the cycloolefin-based monomer is 25 mole %, the glass transition temperature (Tg) becomes about 50° C., and when 65 mole %, the Tg becomes about 200° C. Similarly, in cases in which another cycloolefin-based monomer is used, the glass transition temperature (Tg) becomes higher as the ratio becomes larger.

The cycloolefin-based copolymer of the present invention can be produced by optimizing the polymerization catalyst and the polymerization conditions. It is preferable that the catalyst used for producing the cycloolefin-based copolymer of the present invention is a racemic $C_2$ symmetric metallocene catalyst. The racemic $C_2$ symmetric metallocene catalyst includes racemic ethylidene-bis(indenyl) zirconium dichloride, racemic-dimethylsilyl-bis(2-methyl-benzoindenyl) zirconium dichloride, and racemic-isopropylidene-bis(tetrahydroindenyl) zirconium dichloride. In addition, the meanings of the term racemic $C_2$ symmetric metallocene catalyst is described in Journal of Chemical Reviews, 2000, vol. 100, page 1253-1345. In particular, in chart 10, chart 11, chart 12, and chart 14 of the same document, typical examples of the racemic $C_2$ symmetric metallocene catalyst are exemplified.

Among them, a complex catalytic system of racemic-isopropylidene-bis(tetrahydroindenyl) zirconium dichloride and methylalumoxane is preferable. Another catalyst system can also be used for producing the cycloolefin-based copolymer of the present invention as long as the characteristic microscopic structure can be obtained. However, at the present moment, it has been found that when isopropylidene (1-indenyl) (3-isopropyl-cyclopentadienyl) zirconium dichloride or diphenylmethylidene (1-indenyl) (cyclopentadienyl) zirconium dichloride is used as the catalyst, the cycloolefin-based copolymer of the present invention cannot be obtained.

As the method for producing the cycloolefin-based copolymer of the present invention, such a conventionally known method as described in EU Patent Publication No. 0946618 can be used. Specifically, for example, the cycloolefin-based monomer and the α-olefin-based monomer are introduced into a reactor vessel, and a solution or dispersion liquid of the catalyst system is added thereto, and the temperature is set to a predetermined temperature, and thereby, the copolymer can be obtained. The ratio of the repeating units derived from the monomers in the obtained cycloolefin-based copolymer, and so forth, can be controlled by appropriately setting the temperature and pressure of the reaction. In addition, because the α-olefin-based monomer is often a gas form, it is preferable that the pressure of the olefin is maintained constant so that the induction rate of the olefin monomer in the copolymer is constant. After the polymerization reaction is ended, the catalyst is inactivated by a method of adding an alcohol, or the like, and the catalyst is removed from the reaction system.

The cycloolefin-based copolymer of the present invention has a microscopic structure in which the ratio of the repeating units derived from the cycloolefin-based monomer present as a dimer (Rd) and the ratio of the repeating units present as a trimer (Rt) are limited to predetermined ranges, and therefore, the obtained molded body has extremely few defects (fish eyes) due to gel particles. As described above, to have few fish eyes is a particularly useful property for a product molded by extrusion molding or injection blow molding. By using the cycloolefin-based copolymer according to the present invention, as a molded product by extrusion molding (film, sheet, hose, pipe, rod, fiber, and so forth) or an injection-blow-molded product, a product having high purity, good mechanical characteristics, low water absorbance, high vapor-barrier property, and high transparency can be obtained.

When the molding is performed as described above, only the cycloolefin-based copolymer of the present invention may be used, but it is more preferable to use a cycloolefin-based copolymer composition in which a lubricant is mixed in the cycloolefin-based copolymer of the present invention. A cycloolefin-based copolymer composition containing the cycloolefin-based copolymer of the present invention and a lubricant is also encompassed by the present inventions.

The lubricant is not particularly limited, but at least one selected from the group consisting of aliphatic ester compound having a long-chain aliphatic hydrocarbon group, amide compound having a long-chain aliphatic hydrocarbon group, and salt having a long-chain aliphatic hydrocarbon group is preferable. In addition, the long-chain aliphatic hydrocarbon group means an aliphatic hydrocarbon group having a carbon number of 10 or more, preferably, a carbon number of 12 to 30.

The lubricant composed of the aliphatic ester compound having a long-chain aliphatic hydrocarbon group is not particularly limited and includes a compound in which an aliphatic carboxylic acid such as stearic acid, montanic acid, behenic acid, oleic acid, and palmitic acid and (a polyvalent alcohol such as ethylene glycol, diethylene glycol, propylene glycol, glycerine, pentaerythritol, and dipentaerythritol, or a monovalent alcohol having a long-chain alkyl group such as stearyl alcohol and oleyl alcohol) are ester-linked by dehydration condensation or the like. In addition, in the case of using the polyvalent alcohol, all of the hydroxyl groups in the polyvalent alcohol are not necessarily ester-linked, and a so-called partially esterified compound, in which some hydroxyl groups remain, is also possible. Among them, glycerine distearate, monostearyl behenate, pentaerythritol tetrastearate, pentaerythritol tristearate, and pentaerythritol distearate are preferable, and pentaerythritol tetrastearate is more preferable.

The lubricant composed of the amido compound having a long-chain aliphatic hydrocarbon group is not particularly limited and includes a compound in which the above-described aliphatic carboxylic acid and (a polyvalent amine compound such as ethylene diamine, propylene diamine, tetraethylene diamine, and phenylene diamine, or a monovalent amine compound having a long-chain aliphatic hydrocarbon group such as stearyl amine and montanyl amine) are amide-linked. Among them, ethylene bis-stearyl amide, stearyl stearyl amide, and so forth are preferable, and the ethylene bis-stearyl amide is more preferable.

The lubricant composed of the salt having a long-chain aliphatic hydrocarbon group is not particularly limited and includes salts of the above-described aliphatic carboxylic acid. The metal binding to the salt is not particularly limited, but zinc, magnesium, calcium, and alkaline-earth metal are preferable. Among them, zinc is preferable.

For the lubricant, a wax such as silicone, polypropylene wax, or polyethylene wax may be used together as well as at least one selected from the group consisting of an aliphatic ester compound having a long-chain aliphatic hydrocarbon group, an amide compound having a long-chain aliphatic hydrocarbon group, and a salt having a long-chain aliphatic hydrocarbon group.

For the blending amount of the lubricant in the cycloolefin-based copolymer composition of the present invention, the preferable lower limit with respect to 100 part by weight of the cycloolefin-based copolymer is 0.01 part by weight, and the preferable upper limit thereof is 3 part by weight. When less than 0.01 part by weight, the moldability is may be insufficient. When more than 3 part by weight, transpiration of the lubricant may become large during the molding process, causing such problems as bleeding out on the surface of the molded product.

The cycloolefin-based copolymer composition of the present invention may contain another compatible or incompatible resin component to improve the characteristics in amounts not inhibiting the object of the present invention. Such a resin is not particularly limited and includes polyethylene, polypropylene, polymethyl buta-1-ene, poly(4-methylpenta-1-ene), polybuta-1-ene, polystyrene, polyvinyl chloride, polyvinylidene chloride, polyvinyl fluoride, polytetrafluoroethylene, polychloroprene, polyacrylic ester, polymethacrylic ester, polyacrylamide, polyacrylonitrile, acrylonitrile-butadiene-styrene copolymer, acrylonitrile-styrene copolymer, acrylonitrile-styrene-acrylic ester copolymer, polyvinyl alcohol, polyvinyl acetate, polyvinyl stearate, polyvinyl benzoate, polyvinyl maleate, polyvinyl butyral, polyallyl phthalate, polyallyl melamine, ethylene-vinyl acetate copolymer, polyethyleneoxide-bis glycyl ether copolymer, polyoxymethylene, polyoxyethylene, polyoxymethylene-ethyleneoxide copolymer, polyphenyloxide polymer, polycarbonate, polysulfone, polyurethane, nylon 6, nylon 66, nylon 11, nylon 12, polyethylene terephthalate, polybutylene terephthalate, poly-1,4-dimethylol cyclohexane terephthalate, polyethylene naphthalate (PEN), polyethylene naphthalate bibenzoate (PENBB), phenol-formaldehyde resin, melamine-formaldehyde resin, cellulose, propionic cellulose, cellulose ether, and protein.

The cycloolefin-based copolymer composition of the present invention may contain a conventionally known additive such as ultraviolet stabilizer or antioxidant in amounts not inhibiting the object of the present invention. In general, the additives that can be used for polyolefin such as polyethylene or polypropylene are preferable for the cycloolefin-based copolymer composition of the present invention. The ultraviolet stabilizer is not particularly limited and includes: an ultraviolet absorbent such as hydroxylphenyl benzotriazole, hydroxyl benzophenone, formamidine, and benzylidenecamphor; a quencher such as cinnamate, nickel chelate, and free radical; a radical-trapping agent such as sterically-hindered phenol; a hydroperoxide-decomposing agent such as nickel complex or nickel complex of sulphur-containing compound; and a light stabilizer of HALS type. The antioxidant is not particularly limited and includes; a free-radical-capturing agent substituted phenol and aromatic amine; and a peroxide-decomposing agent such as phosphite, phosphonate, and thio compounds.

The cycloolefin-based copolymer composition of the present invention may contain inactive particles for the purpose of providing the obtained molded body with a sliding property or improving the rolling property. The inactive particles are not particularly limited and include: a silicate of at least 30% by weight of $SiO_2$, $Al_2O_3$, and $SiO_2$; an amorphous or crystalline alumina mineral; and aluminosilicate, an oxide of Mg, Zn, Zr or Ti, a hydrosulfate or Ca, Mg, or Ba, a phosphate of Li, Na, or Ca (including one-hydrogen salt and two-hydrogen salt), a benzoate of Li, Na, or K, a terephthalate of Ca, Ba, Zn, or Mn, a titanate of Mg, Ca, Ba, Zn, Cd, Pb, Sr, Mn, Fe, Co, or Ni, a chromate of Ba or Pb, a carbon (such as carbon black or graphite), a glass (glass particles or glass beads), a carbonate of Ca or Mg, fluorite, a sulfide of Zn or Mo, an organic polymer substance such as polytetrafluoroethylene or polyethylene, talc, lithium fluoride, and a salt of organic acid of Ca, Ba, Zn, or Mn.

A molded body in which the cycloolefin-based copolymer of the present invention or the cycloolefin-based copolymer composition of the present invention is used is also encompassed by the present invention. The molded body of the present invention can be obtained by various production methods. It is also possible that the cycloolefin-based copolymer or the cycloolefin-based copolymer composition of the present invention is dissolved in an appropriate solvent to prepare a solution, and molding is performed by a casting method. Moreover, thermoplastic treatment methods such as a press molding method, extrusion molding method, calendar molding method, injection molding method, and injection blow molding method are also preferable.

According to the extrusion molding method, a tubular body or a film-shaped body can be molded. Particularly, in the case of producing a multilayer film, a coextrusion molding method is effective. In the case that the molded body of the present invention produced by the extrusion molding method is a film-shaped molded body, a monolayer or multilayer film can be exemplified. In this case, it is preferable that at least one layer thereof is made of the cycloolefin-based copolymer of the present invention of 50% by weight, preferably, 85% by weight, more preferably, 90% by weight or more. A surface of such a film-shaped molded body may be subjected to a coating treatment for improving the characteristics thereof.

The molded body of the present invention may be subjected to a surface treatment for the purpose of providing adhesiveness, printing property, antistatic property, or detachability. The surface treatment is not particularly limited but includes corona treatment, flame treatment, plasma treatment, oxidization treatment, and coating treatment.

The molded product of the present invention can be suitably utilized for a condenser dielectric-body film, an electric insulating body, various packaging films, and a shrink film. Moreover, when the impact resistance is improved, the molded body can be utilized as structural parts in various industrial applications. A stretched amorphous film-shaped molded body is particularly preferable as the shrink film. A non-stretch or micro-stretch film-shaped molded body can be suitably used for a thermoformed product of vacuum molding or the like. The other preferable applications of the molded product of the present invention includes lenses, prisms, diffraction gratings, substrates of cover films of optical recording media (such as CD's, DVD's, Blu-ray Discs), cover or light-harvesting substrates of solar cells, high-power laser parts, fibriform or film-shaped light waveguides, liquid crystal display parts such as light guide plates and dispersion plates, and screens of projection televisions. The molded product of the present invention is preferable as catheters, infusion bags, dialyzing-liquid bags, tubes, vessels, transplantation parts, and medical-equipment parts. The molded body of the present invention is also preferable for vessels, vials, cartridges, and syringes, which are utilized for maintenance, exchange, administration, and so forth of a drug solution. The molded body of the present invention is also preferable as packaging films.

Effects of the Invention

The present invention can provide a new cycloolefin copolymer that can be used for production of a molded body having few defects such as gel particles (fish eyes).

PREFERRED MODE FOR CARRYING OUT THE INVENTION

The embodiments of the present invention will be further specifically explained with reference to the following Examples. However, the present invention is not limited to these Examples.

Synthesis Example 1

Synthesis of Norbornene-Ethylene Copolymer 1

Norbornene, hydrocarbon-based solvent, ethylene and hydrogen was supplied to a continuous polymerization apparatus under the conditions that the norbornene concentration was 2.95 mol/L and the ethylene concentration was 1.05 mol/L and the ratio of hydrogen and ethylene was $0.21 \times 10^{-3}$. At the same time, as the catalyst, racemic-isopropylidene-bis (tetrahydroindenyl) zirconium dichloride was supplied and, as a support catalyst, a catalyst system composed of methyalumoxane (10% toluene solution) was supplied to the reaction apparatus. The temperature of the reaction was maintained at 90° C. In the following step, the solvent was removed by high temperature and depressurization. The copolymer in a melt state was extruded in a strand shape, and the copolymer was cut into pellets having a length of 3 mm and a diameter of 2 mm. For the copolymerization, 0.6% antioxidant (trade name: Irganox 1010 manufactured by Chiba Special Chemicals Co. Ltd.) and 0.4% pentaerythritol tetrastearate were added.

The glass transition temperature (Tg) of the obtained norbornene-ethylene copolymer 1 was 133.8° C., and the MVR (260° C., 2.16 kg) was 11.5 mL/10 minutes. Moreover, the result of the $^{13}$C-NMR spectrum measurement showed that the content of the repeating units derived from norbornene (Rn) was 45.5 mole %, and the ratio of the repeating units derived from norbornene present as a dimer (Rd) was 32.1 mole %, and the ratio of the repeating units present as a trimer (Rt) was 10.3 mole %, and the ratio of the racemic bodies in the repeating units derived from norbornene present as a dimer (Rr) was 0.8 mole %.

In addition, the measurement of the $^{13}$C-NMR of norbornene-ethylene copolymer was performed as follows. An amount of 100 mg of norbornene-ethylene copolymerization was dissolved at 100° C. in 900 mg of 1,1,2,2-tetrachloroethane-$d_2$ to produce a sample, and the $^{13}$C-NMR spectrum was measured under the following conditions.

Measurement apparatus: JNM-AL300 manufactured by JEOL Ltd. (resonant frequency of hydrogen atoms: 300 MHz)
Diameter of sample tube: 5 mm
Measurement temperature: 100° C.
Measurement method: power gate method
Pulse width: 4.1 μsec
Delay time: 1.394 sec
Time for importing data: 1.606 sec
Observation frequency width: 20408 Hz
Decoupling: complete decoupling
Integrating times: 10000
Reference of chemical shift: the central peak of the triplet of tetrachloroethane is set to 72.05 ppm.

The glass transition temperature (Tg) of the norbornene-ethylene copolymer was obtained by the DSC method (Diffrential Scanning Calorimetry) according to DIN 563765A and B20, and ISO 11357-1. The sample of the copolymer was taken in a TA aluminium pan (No. 900786.901) and capped with a TA aluminium cover (No. 900779.901), and then, the measurement was performed by using TA 2920 manufactured by TA Instrument Co. Ltd. under the conditions that temperature increase rate was 20° C./minute and the $N_2$ gas flow amount was 50 mL/minute. Moreover, for the Melt Volume Rate (MVR) of norbornene-ethylene copolymer, volume amount of resin discharged for 10 minutes under a temperature of 260° C. and a load of 2.16 kg based on ISO 1133 was measured.

Synthesis Examples 2 to 9

Using the same method except for the synthesis conditions shown in Table 1, the norbornene-ethylene copolymers 2-9 were synthesized. The physical properties of the polymers and the values of microscopic structures thereof are described in Table 2.

Example 1

A norbornene-ethylene copolymer 2 in which ethylene bis-stearyl amide powders corresponding to 1000 ppm were preliminarily sprinkled over the surface was supplied and filled to a hopper, and using a uniaxial extruder (manufactured by Corin Group PLC, three-zone screw (compression

TABLE 1

| | Norbornene Concentration (mol/L) | Ethylene Concentration (mol/L) | Ratio of Hydrogen/Ethylene | Catalyst | Temperature (° C.) | Pellet Diameter (mm) | Additive |
|---|---|---|---|---|---|---|---|
| Synthesis Example 1 (Copolymer 1) | 2.95 | 1.05 | $0.210 \times 10^{-3}$ | racemic-isopropylidene-bis (tetrahydroindenyl) zirconium dichloride | 90 | 3 × 2 | 0.6% Irganox 1010 0.4% Pentaerythritol Tetrastearate |
| Synthesis Example 2 (Copolymer 2) | 6.59 | 1.25 | $0.269 \times 10^{-3}$ | racemic-isopropylidene-bis (tetrahydroindenyl) zirconium dichloride | 100 | 3 × 2 | — |
| Synthesis Example 3 (Copolymer 3) | 3.44 | 0.63 | $0.196 \times 10^{-3}$ | racemic-isopropylidene-bis (tetrahydroindenyl) zirconium dichloride | 100 | 3 × 2 | 0.6% Irganox 1010 0.4% Pentaerythritol Tetrastearate |
| Synthesis Example 4 (Copolymer 4) | 1.95 | 0.41 | $0.107 \times 10^{-3}$ | racemic-isopropylidene-bis (tetrahydroindenyl) zirconium dichloride | 100 | 2 × 1.5 | 0.6% Irganox 1010 0.4% Pentaerythritol Tetrastearate |
| Synthesis Example 5 (Copolymer 5) | 1.95 | 0.41 | $0.107 \times 10^{-3}$ | racemic-isopropylidene-bis (tetrahydroindenyl) zirconium dichloride | 100 | 3 × 2 | 0.6% Irganox 1010 0.4% Pentaerythritol Tetrastearate |
| Synthesis Example 6 (Copolymer 6) | 1.95 | 0.41 | $0.107 \times 10^{-3}$ | racemic-isopropylidene-bis (tetrahydroindenyl) zirconium dichloride | 100 | 3 × 2 | 0.6% Irganox 1010 0.4% Pentaerythritol Tetrastearate |
| Synthesis Example 7 (Copolymer 7) | 1.95 | 0.41 | $0.107 \times 10^{-3}$ | racemic-isopropylidene-bis (tetrahydroindenyl) zirconium dichloride | 100 | 3 × 2 | 0.6% Irganox 1010 |
| Synthesis Example 8 (Copolymer 8) | 2.14 | 0.36 | $0.150 \times 10^{-3}$ | isopropylidene-(1-indenyl) (3-isopropyl-cyclopentadienyl) zirconium dichloride | 100 | 3 × 2 | — |
| Synthesis Example 9 (Copolymer 9) | 5.14 | 1.50 | $0.033 \times 10^{-3}$ | isopropylidene-(1-indenyl) (3-isopropyl-cyclopentadienyl) zirconium dichloride | 70 | 3 × 2 | 0.1% Irganox 1010 |

TABLE 2

| | Physical Properties of Copolymer | | Microscopic Structure of Copolymer | | | |
|---|---|---|---|---|---|---|
| | Tg (° C.) | MVR (mL/10 Minutes) | Rn (mole %) | Rd (mole %) | Rt (mole %) | Rr (mole %) |
| Synthesis Example 1 (Copolymer 1) | 133.8 | 11.5 | 45.5 | 32.1 | 10.3 | 0.8 |
| Synthesis Example 2 (Copolymer 2) | 140.7 | 11.1 | 46.8 | 32.7 | 11.4 | 0.7 |
| Synthesis Example 3 (Copolymer 3) | 136.9 | 12.4 | 48.4 | 28.6 | 15.6 | 1.0 |
| Synthesis Example 4 (Copolymer 4) | 135.4 | 10.1 | 45.6 | 22.6 | 23.7 | 1.3 |
| Synthesis Example 5 (Copolymer 5) | 135.7 | 13.7 | 50.1 | 22.5 | 23.8 | 1.0 |
| Synthesis Example 6 (Copolymer 6) | 133.9 | 10.5 | 48.9 | 19.7 | 24.8 | 0.6 |
| Synthesis Example 7 (Copolymer 7) | 136.0 | 9.4 | 49.4 | 19.5 | 24.0 | 1.0 |
| Synthesis Example 8 (Copolymer 8) | 139.9 | 14.4 | 46.5 | 39.6 | 0.0 | 0.3 |
| Synthesis Example 9 (Copolymer 9) | 141.1 | 13.5 | 47.3 | 39.3 | 0.5 | 16.0 | ratio 2) with a screw diameter of 30 mm, L/D=30, parts, with a maddock shear element of 2.5 D parts and a pineapple mixed element of 2.5 D parts attached is to the head, and a width of the T-Die of 25 cm) was used and a film of a thickness of 100 μm was formed. The temperature of the cylinder and the die was set to 270° C. and the screw rotation frequency was set to 40 rpm, and the film was rolled by a cooling roll unit (manufactured by Corin Group PLC, type 136-230). The temperature of the cooled roll was set to 130° C.

Examples 2-4, Comparative Example 1, 2

By the same method as Example 1 except for using the norbornene-ethylene copolymer shown by Table 3, the films were obtained.

With respect to the films obtained in Examples 1-4 and Comparative Examples 1, 2, defects of the films (gel, fish eyes) were evaluated by using a commercially available film-inspecting system (manufactured by Optical Control Systems Inc., FS-5). An optical source and a camera were used in a transmitted-light mode, and only defect points with a diameter of 100 μm or more were counted. The number of the defect points in the film obtained in Comparative Example 1 was set to 100%, and relative evaluation was performed. The results are shown in Table 3.

TABLE 3

|  | Copolymer | Film Defect Points (%) |
| --- | --- | --- |
| Example 1 | 2 | 4.7 |
| Example 2 | 3 | 1.7 |
| Example 3 | 1 | 1.9 |
| Example 4 | 6 | 4.5 |
| Comparative Example 1 | 9 | 100.0 |
| Comparative Example 2 | 8 | 25.0 |

Example 5

By a method of injection into a mold having one cavity by using an injection blow molding apparatus (manufactured by Jomar Inc., Model 40: screw diameter is 35 mm), the norbornene-ethylene copolymer 2 was subjected to injection blow molding, and thereby, a vial with a volume of 20 mL having a thread ridge on a neck portion thereof was produced.

Comparative Example 3

In the same method as Example 5 except for using the norbornene-ethylene copolymer 9, a vial was produced.

The qualities of the vials produced in Example 5 and Comparative Example 3 were evaluated by the following method from the view points of defect points and transparency. That is, the neck of the vial was held and directed to an optical source of a table lamp or the like, and with rotating the vial, the defect points such as fish eyes were counted by eye and evaluated. Moreover, the vial was put (at a height of 3 to 5 mm) on a black letter string printed on white paper, and the transparency was evaluated by eye by the following criteria.

Category I: the letters cannot be read although the vial is in contact with the paper.

Category II: it becomes impossible to read the letters when the vial is separated from the paper by 1 cm Category III: the letters can be read even if the vial is separated from the paper by 5 cm.

The result is shown in Table 4.

TABLE 4

|  | Copolymer | Transparency | Defect Points |
| --- | --- | --- | --- |
| Example 5 | 2 | Category III | 20 or less |
| Comparative Example 3 | 9 | Category II | 200 or more |

Examples 6-11

The norbornene-ethylene copolymers shown in Table 5 were injection-molded into flat plates of 60×60×2 mm. As the injection molding apparatus, KM90/210 B202219 (screw diameter is 22 mm) manufactured by Krauss-Maffei Inc. was used, and a mold having two cavities was used. The pellets of the copolymers were preliminarily vacuum-dried for 60° C. for 8 hours before molding. The barrel temperature of the molding apparatus was set to 260° C. and the nozzle temperature was set to 250° C. and the temperature of both sides of the mold was set to 120° C. Plasticization was performed in 8-10 seconds under the condition that the pressure indicator display of the backing pressure was 13 bar and the screw rotational frequency was 50%. For the injection speed, the injection was performed for 0.6-0.7 seconds at a 100% speed until the screw position became 6.3 mm. Then, hold pressure was applied for 6 sec at about 35 bar of pressure indicator display. After 50 seconds, the molded body was taken out of the mold, and the sprue was cut off after cooling for 5 minutes.

The haze and degree of yellowness of the flat plates obtained in Examples 6-11 were measured. The haze was measured by the method according to DIN ISO 14782 by using a Haze-Guard Dual manufactured by Gardener Inc. Moreover, the degree of yellowness was measured by the method according to DIN 6167 by using a color-sphere spectrometer manufactured by BYK-Gardner Inc. The results are shown in Table 5.

TABLE 5

|  | Copolymer | Haze (%) | Degree of Yellowness |
| --- | --- | --- | --- |
| Example 6 | 2 | 0.53 | 0.84 |
| Example 7 | 3 | 1.83 | 1.26 |
| Example 8 | 1 | 1.83 | 1.40 |
| Example 9 | 4 | 0.76 | 1.24 |
| Example 10 | 6 | 0.74 | 1.12 |
| Example 11 | 5 | 0.82 | 1.46 |

Comparative Example 4

The film was obtained by the same method as Example 1 except that the norbornene-ethylene copolymer 7 was used and the pellet was not sprinkled with the ethylene bis-stearyl amide powders.

Examples 12-14

To the norbornene-ethylene copolymer 7, as the lubricant, 0.2% of pentaerythritol stearate (Example 12), 0.2% of ethylene bis stearylamine (EBS) (Example 13), and 0.1% of zinc stearate (ZnSt) (Example 14) were added, and with a biaxial extruder of 30 mm, they were melted and kneaded to knead the lubricant, and thereby, the pellets were prepared. The films were obtained by the same method as Comparative Example 4 except for using the obtained pellets.

Comparative Examples 5 and 6

Only norbornene-ethylene copolymer 8 was added (Comparative Example 5), and 0.4% of pentaerythritol stearate was added to the norbornene-ethylene copolymer 8, and the pellets were prepared by melting and kneading with a biaxial extruder of 30 mm. The films were obtained by the same method as Comparative Example 4 except for using the obtained pellets.

For the films obtained in Comparative Example 4, Examples 12-14, and Comparative Examples 5 and 6, the defects of the films (gel, fish eyes) were evaluated by using a commercially available film-inspecting system (manufactured by Optical Control Systems Inc., FS-5). An optical source and a camera were used in a transmitted-light mode, and only defect points of a diameter of 100 μm or more were counted. The number of the defect points in the film obtained in Comparative Example 1 was set to 100%, and a relative evaluation was performed. The results are shown in Table 6.

TABLE 6

| | Copolymer | Lubricant | Film Defect Points (%) |
|---|---|---|---|
| Comparative Example 4 | 7 | — | 12.0 |
| Example 12 | 7 | Pentaerythritol Tetrastearate 0.2% | 6.2 |
| Example 13 | 7 | Ethylene Bis-stearylamide 0.2% | 4.8 |
| Example 14 | 7 | Zinc Stearate 0.1% | 2.7 |
| Comparative Example 5 | 8 | — | 30.0 |
| Comparative Example 6 | 8 | Pentaerythritol Tetrastearate 0.4% | 12.0 |

INDUSTRIAL APPLICABILITY

According to the present invention, a new cycloolefin copolymer that can be used for production of a molded body having few defects such as gel particles (fish eyes) can be provided.

We claim:

1. A method for improving transparency of a molded body, comprising:
adjusting a cycloolefin-based copolymer to include:
a content of 20-80 mole % of repeating units derived from at least one cycloolefin-based monomer selected from the group consisting of a monomer represented by general formula (I), a monomer represented by general formula (II), a monomer represented by general formula (III), a monomer represented by general formula (IV), and a monomer represented by general formula (V); and
a content of 80-20 mole % of repeating units derived from an α-olefin-based monomer,
wherein a content of the repeating units derived from the cycloolefin-based monomer present as a dimer (Rd) is adjusted to 50 mole % or less and a content of the repeating units derived from the cycloolefin-based monomer present as a trimer (Rt) is adjusted to 5 mole % or more

(I)

(II)

(III)

(IV)

(V)

wherein, in the formula, $R^1$, $R^2$, $R^3$, and $R^4$ each independently represents hydrogen, a linear or branched alkyl group having a carbon number of 1 to 8, an aryl group having a carbon number of 6 to 18, an alkylene aryl group having a carbon number of 7 to 20, or a cyclic or non-cyclic alkenyl group having a carbon number of 2 to 20; a carbon atom may be covalently bonded to $R^1$, $R^2$, $R^3$, and $R^4$ by a saturated, unsaturated, or aromatic ring; and $R^1$, $R^2$, $R^3$, and $R^4$ may be replaced by a polar group comprising a halogen atom, hydroxyl group, ester group, alkoxy group, carboxy group, cyano group, amido group, imido group, or silyl group.

2. The method according to claim 1, wherein the content of the repeating units derived from the cycloolefin-based monomer present as a dimer (Rd) is adjusted to 40 mole % or less and the content of the repeating units derived from the cycloolefin-based monomer present as a trimer (Rt) is adjusted to 8 mole % or more.

3. The method according to claim 1, wherein the content of the repeating units derived from the cycloolefin-based monomer present as a dimer (Rd) is adjusted to 18-40 mole % and the content of the repeating units derived from the cycloolefin-based monomer present as a trimer (Rt) is adjusted to 8-26 mole %.

4. The method according to claim 1, further comprising:
adjusting a content of a racemic form (Rr) in the repeating units derived from the cycloolefin-based monomer present as a dimer to 8 mole % or less.

5. The method according to claim 1, wherein the α-olefin-based monomer is represented by formula (VI)

(VI)

wherein $R^9$, $R^{10}$, $R^{11}$, and $R^{12}$ each represents hydrogen, a linear or branched alkyl group having a carbon number of 1 to 8, or an aryl group having a carbon number of 6 to 18.

6. The method according to claim 1, further comprising:
adjusting a content of repeating units derived from a monomer represented by formula (VII) to 0-10 mole %:

(VII)

wherein m represents an integer of 2 to 10.

7. The method according to claim 5, wherein the cycloolefin based monomer is selected from the group consisting of norbornene, alkyl substituted norbornene, vinyl norbornene, norboranadiene, tetracyclododecene; wherein the α-olefin based monomer is selected from the group consisting of a monomer represented by the formula (VI).

8. The method according to claim 1, wherein the cycloolefin-based monomer is norbornene, and the α-olefin based monomer is ethylene.

9. The method according to claim 1, wherein the content of the repeating units derived from the at least one cycloolefin-based monomer is adjusted to 40-60 mole %.

10. The method according to claim 1, wherein the molded body comprises:
 100 parts by weight of the cycloolefin-based copolymer; and
 0.01-3 parts by weight of at least one lubricant selected from the group consisting of aliphatic ester compound, amide compound, and salt each having a long-chain aliphatic hydrocarbon group.

11. The method according to claim 1, wherein the molded body is formed by an extrusion molding method.

12. The method according to claim 1, wherein the molded body is formed by an injection molding method.

13. The method according to claim 1, wherein the molded body is formed by an injection blow molding method.

14. The method according to claim 1, wherein the adjusting step includes:
 contacting the cycloolefin-based monomer and α-olefin based monomer with a racemic $C_2$ metallocene catalyst selected from the group consisting of racemic ethylidene-bis(indenyl)zirconium dichloride, racemic-dimethylsilyl-bis(2-methyl-benzoindenyl)zirconium dichloride, racemic-isopropylidene-bis(tetrahydroindenyl) zirconium dichloride, diphenylmethylidene(1-indenyl)(cyclopentadienyl)zirconium dichloride, and combinations thereof.

15. The method according to claim 14, wherein the racemic $C_2$ metallocene catalyst is a combination of racemic-isopropylidene-bis(tetrahydroindenyl)zirconium dichloride and methylaluminoxane.

* * * * *